(12) United States Patent
Balshi et al.

(10) Patent No.: US 11,266,486 B2
(45) Date of Patent: Mar. 8, 2022

(54) POSITIONING HANDLE AND OCCLUSAL LOCKS FOR REMOVABLE PROSTHESIS

(71) Applicant: Global Dental Science, LLC, Scottsdale, AZ (US)

(72) Inventors: Thomas J. Balshi, Gwynedd, PA (US); Johannes Petrus Michael Grobbee, Oosterbeek (NL); Stephen F. Balshi, Chalfont, PA (US); Glenn Wolfinger, Ft. Washington, PA (US)

(73) Assignee: Global Dental Science, LLC, Scottsdale, AZ (US)

( * ) Notice: Subject to any disclaimer, the term of this patent is extended or adjusted under 35 U.S.C. 154(b) by 0 days.

(21) Appl. No.: 15/628,591

(22) Filed: Jun. 20, 2017

(65) Prior Publication Data

US 2019/0201172 A1 Jul. 4, 2019

Related U.S. Application Data

(60) Provisional application No. 62/352,552, filed on Jun. 20, 2016.

(51) Int. Cl.
| | | |
|---|---|---|
| *A61C 13/225* | (2006.01) | |
| *A61C 13/34* | (2006.01) | |
| *A61C 13/107* | (2006.01) | |
| *A61C 13/00* | (2006.01) | |
| *A61C 13/01* | (2006.01) | |

(52) U.S. Cl.
CPC ........ *A61C 13/225* (2013.01); *A61C 13/0001* (2013.01); *A61C 13/0004* (2013.01); *A61C 13/01* (2013.01); *A61C 13/34* (2013.01)

(58) Field of Classification Search
CPC ..... A61C 13/097; A61C 13/28; A61C 13/277; A61C 13/225; A61C 13/12; A61C 13/0004; A61C 13/0027; A61C 13/0025; A61C 13/0021; A61C 13/001; A61C 13/0097;
(Continued)

(56) References Cited

U.S. PATENT DOCUMENTS

| 200,445 A | 2/1878 | Fahnstock |
|---|---|---|
| 321,847 A | 7/1885 | Pelroe et al. |

(Continued)

FOREIGN PATENT DOCUMENTS

| CA | 2505892 | 5/2004 |
|---|---|---|
| CN | 1750797 | 3/2006 |

(Continued)

OTHER PUBLICATIONS

A New Protocol for Immediate Functional Loading of Dental Implants, Dentristy Today, by Thomas J. Balshi and Glenn J. Wolfinger, Sep. 2001 vol. 20, No. 9.
(Continued)

*Primary Examiner* — Jacqueline T Johanas
*Assistant Examiner* — Shannel Nicole Belk
(74) *Attorney, Agent, or Firm* — Harvey Law, PC (57) ABSTRACT

The present invention discloses occlusal locks and positioning handles as part of an upper and/or lower denture or other prosthetic solution, the locks facilitating alignment construction and delivery of the conversion prosthesis, expediting the clinical procedure, and ensuring accurate alignment that improves the accuracy of rapid tooth replacement procedures.

20 Claims, 10 Drawing Sheets

(58) Field of Classification Search
CPC ..... A61C 5/007; A61C 19/05; A61C 13/1016;
A61C 13/34
USPC .................................................. 433/179, 172
See application file for complete search history.

(56) References Cited

U.S. PATENT DOCUMENTS

| | | | |
|---|---|---|---|
| 452,653 A * | 5/1891 | Stedman | A61C 13/28 433/179 |
| 474,104 A * | 5/1892 | Stedman | A61C 13/28 433/179 |
| 711,324 A | 10/1902 | Lacy | |
| 830,887 A | 9/1906 | Robert | |
| 1,223,450 A | 4/1917 | Van Allen | |
| 1,293,627 A | 2/1919 | Bowers | |
| 1,585,348 A | 5/1926 | Hick et al. | |
| 1,652,910 A | 12/1927 | Psayla | |
| 1,714,185 A | 5/1929 | Hugh | |
| 1,863,591 A | 6/1932 | Crowell | |
| 1,914,606 A | 6/1933 | Kinna et al. | |
| 2,036,678 A | 4/1936 | White | |
| 2,107,181 A | 2/1938 | Guyton | |
| 2,398,671 A | 4/1946 | Saffir | |
| 2,418,833 A | 4/1947 | Harris et al. | |
| 2,472,492 A | 6/1949 | Saffir | |
| 2,577,769 A * | 12/1951 | Kane | A61C 13/1026 433/206 |
| 2,591,678 A * | 4/1952 | Cleman | A61C 13/097 433/172 |
| 2,598,998 A * | 6/1952 | Kaplan | A61C 13/225 433/179 |
| 2,602,997 A | 7/1952 | Clawson | |
| 2,641,835 A | 6/1953 | Greenmum | |
| 2,770,881 A * | 11/1956 | Lodi | A61C 13/28 433/179 |
| 2,985,961 A | 5/1961 | Schwartz | |
| 2,994,957 A | 8/1961 | Mcleod | |
| 3,043,005 A * | 7/1962 | Morris | A61C 13/28 433/179 |
| 3,083,459 A | 4/1963 | McMurry et al. | |
| 3,241,238 A | 3/1966 | Kersten | |
| 3,335,495 A | 8/1967 | Theodore | |
| 3,456,347 A * | 7/1969 | Spinella | A61C 9/00 433/196 |
| 3,458,936 A | 8/1969 | Tuccillo et al. | |
| 3,470,614 A | 10/1969 | Kelly | |
| 3,517,443 A * | 6/1970 | Holley | A61C 13/00 433/191 |
| 3,518,761 A | 7/1970 | Susman et al. | |
| 3,644,996 A | 2/1972 | Wenkle | |
| 3,667,123 A | 6/1972 | Huey | |
| 3,702,027 A | 11/1972 | Marshall et al. | |
| 3,727,309 A | 4/1973 | Huey | |
| 3,744,702 A | 7/1973 | Ellison | |
| 3,748,739 A | 7/1973 | Thibert | |
| 3,813,777 A | 6/1974 | VanHandel et al. | |
| 3,846,911 A | 11/1974 | Wichner | |
| 3,908,272 A | 9/1975 | Arnold | |
| 3,937,773 A | 2/1976 | Huffman | |
| 4,029,632 A | 6/1977 | Gross et al. | |
| 4,227,877 A | 10/1980 | Turead et al. | |
| 4,247,287 A * | 1/1981 | Gigante | A61C 13/00 264/18 |
| 4,299,573 A | 11/1981 | Ricci | |
| 4,398,884 A | 8/1983 | Huffman | |
| 4,533,325 A | 8/1985 | Blair | |
| 4,575,340 A | 3/1986 | Lustig | |
| 4,591,341 A | 5/1986 | Andrews | |
| 4,634,377 A | 1/1987 | Behrend | |
| 4,780,082 A * | 10/1988 | Schwartz | A61C 13/1013 433/213 |
| 4,784,608 A * | 11/1988 | Mays | A61C 8/0048 433/172 |
| 4,931,016 A | 6/1990 | Sillard | |
| 5,030,102 A | 7/1991 | Lang | |
| 5,098,296 A | 3/1992 | Cullen | |
| 5,151,044 A | 9/1992 | Rotsaert | |
| 5,169,309 A | 12/1992 | Staubli et al. | |
| 5,188,529 A | 2/1993 | Luth | |
| 5,234,339 A | 8/1993 | Grigereit | |
| 5,286,198 A * | 2/1994 | Barnes | A61C 13/28 433/179 |
| 5,427,906 A | 6/1995 | Hanson | |
| 5,672,305 A | 9/1997 | Kogure | |
| 5,711,668 A | 1/1998 | Huestis | |
| 5,716,214 A | 2/1998 | Lund | |
| 5,718,584 A | 2/1998 | Wong | |
| 5,775,899 A | 7/1998 | Huffman | |
| 5,833,461 A | 11/1998 | Wong | |
| 5,839,900 A | 11/1998 | Billet et al. | |
| 5,885,078 A | 3/1999 | Cagna et al. | |
| 5,934,906 A | 8/1999 | Phimmasone | |
| 5,951,289 A * | 9/1999 | Kura | A61C 13/097 433/197 |
| 6,030,218 A | 2/2000 | Robinson | |
| 6,056,547 A | 5/2000 | Names | |
| 6,116,070 A | 9/2000 | Oshida | |
| 6,126,445 A | 10/2000 | Willoughby | |
| 6,139,322 A | 10/2000 | Liu | |
| 6,149,427 A | 11/2000 | Van Handel | |
| 6,224,372 B1 | 5/2001 | Ibsen et al. | |
| 6,227,851 B1 | 5/2001 | Chisti | |
| 6,257,895 B1 | 7/2001 | Oestriech | |
| 6,384,107 B2 | 5/2002 | Liu | |
| 6,422,864 B1 | 7/2002 | Glatt | |
| 6,488,503 B1 | 12/2002 | Ichkus et al. | |
| 6,616,444 B2 | 9/2003 | Andreido et al. | |
| 6,788,986 B1 | 9/2004 | Traber et al. | |
| 6,814,575 B2 | 11/2004 | Poirier | |
| 6,851,949 B1 | 2/2005 | Sachdeva | |
| 7,021,934 B2 | 4/2006 | Aravena | |
| 7,153,135 B1 | 12/2006 | Thomas | |
| 7,234,940 B2 | 6/2007 | Weissman | |
| 7,433,810 B2 | 10/2008 | Pavloskaia et al. | |
| 7,474,932 B2 | 1/2009 | Geng | |
| 7,530,810 B2 | 5/2009 | Clement | |
| 7,653,455 B2 | 1/2010 | Cinader, Jr. | |
| 7,704,076 B2 | 4/2010 | Mullaly | |
| 7,758,345 B1 | 7/2010 | Christensen | |
| 7,758,346 B1 | 7/2010 | Letcher | |
| 7,806,691 B2 | 10/2010 | Berger | |
| 7,901,209 B2 | 3/2011 | Saliger et al. | |
| 7,909,607 B2 | 3/2011 | Yau et al. | |
| 7,950,924 B2 | 5/2011 | Brajnovic | |
| 8,043,091 B2 | 10/2011 | Schmitt | |
| 8,348,669 B1 | 1/2013 | Schmitt | |
| 8,567,408 B2 | 10/2013 | Roettger | |
| 8,641,938 B2 | 2/2014 | Howe | |
| 8,801,431 B2 | 8/2014 | Thompson et al. | |
| 8,875,398 B2 | 11/2014 | Balshi et al. | |
| 9,055,993 B2 | 6/2015 | Grobbee et al. | |
| 9,155,599 B2 | 10/2015 | Thompson et al. | |
| 9,213,784 B2 | 12/2015 | Thompson et al. | |
| 9,364,302 B2 | 6/2016 | Thompson et al. | |
| 9,402,698 B2 | 8/2016 | Thompson et al. | |
| 9,411,010 B2 | 8/2016 | Goyal et al. | |
| 9,717,572 B2 | 8/2017 | Thompson et al. | |
| 2002/0015934 A1 | 2/2002 | Rubert et al. | |
| 2002/0180760 A1 | 12/2002 | Rubert et al. | |
| 2003/0108845 A1 | 6/2003 | Giovannone | |
| 2003/0162147 A1 | 7/2003 | Monkmayer | |
| 2003/0211444 A1 | 11/2003 | Andrews | |
| 2004/0005530 A1 | 1/2004 | Mullaly | |
| 2004/0029068 A1 | 2/2004 | Sachdeva et al. | |
| 2004/0163291 A1 | 8/2004 | Pena | |
| 2004/0185422 A1 | 9/2004 | Orth et al. | |
| 2004/0219490 A1 | 11/2004 | Gartner et al. | |
| 2005/0175957 A1 | 8/2005 | Haje et al. | |
| 2005/0186539 A1 | 8/2005 | McLean | |
| 2005/0284489 A1 | 12/2005 | Ambis | |
| 2006/0040232 A1 | 2/2006 | Shoup | |
| 2006/0040236 A1 | 2/2006 | Schmitt | |
| 2006/0063135 A1 | 3/2006 | Mehl | |

(56) References Cited

U.S. PATENT DOCUMENTS

| | | |
|---|---|---|
| 2006/0172254 A1* | 8/2006 | Shindo ............... A61C 7/36 433/68 |
| 2006/0210945 A1 | 9/2006 | Savic et al. |
| 2006/0286507 A1 | 12/2006 | Dequeker |
| 2007/0154868 A1 | 6/2007 | Scharlack et al. |
| 2007/0190492 A1 | 8/2007 | Schmitt |
| 2007/0231774 A1 | 10/2007 | Massad |
| 2008/0085489 A1 | 4/2008 | Schmitt |
| 2008/0090207 A1 | 4/2008 | Rubbert |
| 2008/0127698 A1 | 6/2008 | Luckey et al. |
| 2008/0206710 A1 | 8/2008 | Kruth et al. |
| 2008/0206714 A1 | 8/2008 | Schmitt |
| 2008/0209974 A1 | 9/2008 | Ewolski et al. |
| 2008/0300716 A1 | 12/2008 | Kopelman |
| 2009/0081618 A1 | 3/2009 | Lamar |
| 2009/0143609 A1 | 6/2009 | Araya |
| 2009/0148813 A1 | 6/2009 | Sun et al. |
| 2009/0162813 A1 | 6/2009 | Glor |
| 2009/0181346 A1 | 7/2009 | Orth |
| 2009/0287332 A1 | 11/2009 | Adusumilli et al. |
| 2009/0291407 A1 | 11/2009 | Kuo |
| 2009/0325125 A1 | 12/2009 | Diangelo et al. |
| 2010/0015572 A1 | 1/2010 | Dirkes et al. |
| 2010/0062394 A1 | 3/2010 | Jones et al. |
| 2010/0086186 A1 | 4/2010 | Zug et al. |
| 2010/0094446 A1 | 4/2010 | Balock et al. |
| 2010/0105011 A1 | 4/2010 | Karkar et al. |
| 2010/0324875 A1 | 12/2010 | Kalili |
| 2011/0045442 A1 | 2/2011 | Adusimilli |
| 2011/0112804 A1 | 5/2011 | Chishti et al. |
| 2011/0129796 A1 | 6/2011 | Riggio |
| 2011/0236856 A1 | 9/2011 | Kanazawa et al. |
| 2011/0244417 A1 | 10/2011 | Hilsen et al. |
| 2012/0058449 A1 | 3/2012 | Sklarski et al. |
| 2012/0094253 A1 | 4/2012 | Berger |
| 2012/0095732 A1 | 4/2012 | Fisker et al. |
| 2012/0100500 A1 | 4/2012 | Gao |
| 2012/0178045 A1 | 7/2012 | Massad |
| 2012/0179281 A1 | 7/2012 | Steingart et al. |
| 2012/0258426 A1 | 10/2012 | Boe |
| 2012/0285019 A1 | 11/2012 | Schechner et al. |
| 2012/0308954 A1* | 12/2012 | Dunne ............... A61C 13/0013 433/57 |
| 2012/0329008 A1 | 12/2012 | Fishman et al. |
| 2013/0101962 A1 | 4/2013 | Howe |
| 2013/0108988 A1 | 5/2013 | Simoncic |
| 2013/0167380 A1 | 7/2013 | Balshi |
| 2013/0209962 A1 | 8/2013 | Thompson et al. |
| 2013/0216978 A1 | 8/2013 | Thompson et al. |
| 2013/0218532 A1 | 8/2013 | Thompson et al. |
| 2013/0221554 A1 | 8/2013 | Jung |
| 2013/0249132 A1 | 9/2013 | Thompson et al. |
| 2013/0280672 A1 | 10/2013 | Thompson et al. |
| 2013/0316302 A1 | 11/2013 | Fisker |
| 2013/0337412 A1 | 12/2013 | Kwon |
| 2014/0045967 A1 | 2/2014 | Thomas et al. |
| 2014/0099600 A1 | 4/2014 | Harrison |
| 2014/0272796 A1 | 9/2014 | Grobbee et al. |
| 2015/0010885 A1 | 1/2015 | Balshi et al. |
| 2015/0037760 A1 | 2/2015 | Thompson et al. |
| 2015/0064653 A1 | 3/2015 | Grobbee et al. |
| 2015/0134094 A1 | 5/2015 | Thompson et al. |
| 2015/0223969 A1* | 8/2015 | Smith ............... A61F 5/56 128/861 |
| 2015/0230891 A1 | 8/2015 | Grobbee et al. |
| 2015/0245891 A1 | 9/2015 | Grobbee |
| 2015/0245892 A1 | 9/2015 | Grobbee |
| 2016/0262849 A1* | 9/2016 | Hultgren ............... G09B 23/283 |
| 2016/0374778 A1 | 12/2016 | Grobbee |
| 2017/0012599 A1 | 1/2017 | Iwanaga |
| 2017/0252133 A1* | 9/2017 | Heffelfinger ............... A61C 13/097 |
| 2017/0273766 A1* | 9/2017 | Fisker ............... B33Y 10/00 |

FOREIGN PATENT DOCUMENTS

| | | |
|---|---|---|
| EP | 1062916 | 12/2000 |
| EP | 1252867 | 10/2002 |
| FR | 2035133 | 12/1970 |
| JP | 10277059 | 10/1998 |
| JP | 2008307281 | 12/2008 |
| WO | WO2001032096 | 12/2001 |
| WO | WO2003024352 | 3/2003 |
| WO | WO2004060197 | 7/2004 |
| WO | WO2009105661 | 8/2009 |
| WO | WO2009105700 | 8/2009 |
| WO | WO2010022479 | 3/2010 |
| WO | WO2012030493 | 3/2012 |
| WO | WO2012041329 | 4/2012 |
| WO | WO2012061652 | 5/2012 |
| WO | WO2012061659 | 5/2012 |
| WO | WO2012061660 | 5/2012 |
| WO | WO2012064655 | 5/2012 |
| WO | WO2014130536 | 8/2014 |
| WO | WO2014159436 | 10/2014 |
| WO | WO2015063062 | 3/2015 |
| WO | WO-2015089676 A1 * | 6/2015 ............. A61C 13/34 |

OTHER PUBLICATIONS

"Positioning handle and Occlusal locks for the Teeth-in-Day protocol", The Journal of Prosthetic Dentistry, 2016, Thomas J. Balshi, Glenn J. Wolfinger and Stephen F. Balshi, p. 274-278.

European Application EP14840991.5—EPO Search Report dated Apr. 19, 2017.

PCT Application PCTUS2014051008—ISRWO dated Nov. 20, 2014.

PCT Application PCTUS2014051008—Preliminary Report on Patentability dated Mar. 1, 2016.

Positioning handle and occlusal locks for the Teeth-in-a-Day protocol:, The Journal of Prosthetic Dentistry, 2016, Balshi et al., p. 274-278.

"A New Protocol for Immediate Functional Loading of Dental Implants", Dentistry Today, Balshi et al., 2001, Sept vol. 20, No. 9.

U.S. Appl. No. 13/343,566—Restriction Requirement dated Apr. 16, 2014.

U.S. Appl. No. 13/343,566—Notice of Allowance dated Jun. 26, 2014.

U.S. Appl. No. 14/013,295—Non-Final Official Action dated Dec. 19, 2014.

U.S. Appl. No. 14/013,295—Notice of Allowance dated Apr. 13, 2015.

U.S. Appl. No. 14/495,036—Non-Final Official Action dated May 19, 2015.

U.S. Appl. No. 14/495,036—Final Official Action dated Nov. 6, 2015.

U.S. Appl. No. 14/495,036—Final Official Action dated Jun. 7, 2016.

U.S. Appl. No. 14/698,649—Non-Final Official Action dated Sep. 26, 2017.

U.S. Appl. No. 15/181,032—Non-Final Official Action dated Jul. 6, 2017.

U.S. Appl. No. 15/191,868—Non-Final Official Action dated Jun. 16, 2017.

U.S. Appl. No. 15/390,330—Non-Final Official Action dated Jun. 1, 2017.

* cited by examiner

POSITIONING HANDLE AND OCCLUSAL LOCKS FOR REMOVABLE PROSTHESIS

FIELD OF THE INVENTION

The invention relates to the field of implant prosthodontics and specifically removable prostheses, and further relates to accurate alignment during the conversion prosthesis technique. The invention even further relates to improvements in computer-aided design of digital denture fabrications. The invention even further relates to implant-supported prostheses, and techniques for creating digital dentures to prevent errors in aligning upper and lower arches of a dental patient receiving prosthetic dental solutions.

BACKGROUND OF THE INVENTION

Digital denture technology has provided numerous benefits to dentists and patients undergoing both conventional denture treatment and implant supported prostheses. Well-designed digital denture solutions bring the precision, speed, and profitability of digital process automation to removable dentistry, using computer aided engineering. Computer-aided engineering in conjunction with computer-aided design and computer aided manufacturing (CAD/CAM) improved on traditional CAE/CAD/CAM fabrication by using sophisticated, scientific algorithms to aid and control the bulk of design and manufacturing tasks. The technology has dynamically changed the trajectory of removable prosthetics from a labor-intensive, inconsistent process to a consistent, algorithmically driven complete mouth rehabilitation process.

Traditionally, a denture for an immediate loading protocol would be processed using individual denture teeth. The denture would then become the conversion prosthesis. The conversion prosthesis would have three separate components, or areas of interest required to make the conversion occur: 1) An upper, or maxillary portion, 2) a lower, or mandibular portion, and 3) an articulation, a bite registration or other structure to allow the upper and lower portion to be affixed in a preferred occlusion.

On the labial aspect of the denture teeth, a heavy gauge wire would be secured with orthodontic resin at mid-tooth position. The wire served as a handle to be able to maneuver and position the prosthesis into the proper orientation with a needle holder when establishing the occlusal relationship with the opposing arch. This procedure has been clinically utilized for at least three decades.

The process described in the prior art could be time consuming and costly. Further, the need for reinforcement of denture teeth with heavy gauge wire, filament or other materials proved helpful, but labor intensive as it included an extra step. See the journal article, "A New Protocol for Immediately Loading of Dental Implants" by Balshi and Wolfinger, specifically FIG. 15 in that publication. The wire was intended to create grip to hold denture with pliers. In other words, the prior art solution was to use a manually mounted wire and outside implements to ideally position the denture.

A need exists for a better way to align the occlusion of the upper and lower portion of the conversion denture. A need further exists to align the occlusion intra-orally, rather than in a lab or other setting outside the mouth. A need further exists for a more stable approach for the upper and lower portions denture to be properly aligned without building a separate structure like a splint between them. A need even further exists to streamline the entire procedure of treating a mandibular and maxillary arch whereas the solution requires determining and setting proper occlusion of the upper and lower denture.

SUMMARY OF THE INVENTION

The present invention provides in a first embodiment a dental prosthesis comprising an upper portion of the dental prosthesis; a lower portion of the dental prosthesis; a lock for securing an upper or lower portion of the dental prosthesis to an opposite portion of the prosthesis; a posterior area of the dental prosthesis; an anterior area of the dental prosthesis; a male portion located towards the posterior area of a first portion of the dental prosthesis, the male portion projecting away from first portion of the prosthesis and towards the second portion of the prosthesis, the second portion being an opposing arch of the first portion; a female portion located towards the posterior area of the second portion of the prosthesis distally of the tooth area, the female portion having a complementary structure to receive the male portion thereby joining the first portion and the second portion to achieve a desired tooth alignment and occlusion; and wherein the male portion and female portion of the prosthesis may be located distally of the tooth area of the prosthesis and wherein the male portions may be located in a base portion of the prosthesis, and wherein the male portion may located on at least one tooth of the male portion and the female portion of the prosthesis is located on at least one tooth of the male portion, and wherein the male portion may be a projection from the first portion of the prosthesis and the female portion is an existing tooth in the second portion, and wherein the male portion is located in a base portion of the prosthesis; and may further comprise a handle located towards the anterior side, the handle being milled as part of the prosthesis the handle having a top side and a bottom side and extending distally in an anterior direction from the prosthesis; and the prosthesis may be milled from a digital denture design.

A second embodiment of the invention may include an upper and lower set of full dentures for a dental patient comprising a first arch of the denture, a second arch of the denture being in occlusal opposition to the first arch; a locking portion securing a first arch of the denture to the second arch of the denture, the locking portion projecting from a first arch to a receiving portion of the second arch, whereby a dentist may align the first arch and second arch to set an occlusion of the dental patient, the receiving portion being at least one tooth on the second arch, the locking portion projecting into the receiving portion that approximates a positive mold at least one tooth on the second arch; locking portion emanating from at least one tooth towards an anterior side of the first arch, the locking portion forming a slight compression on the receiving portion, the locking portion having a frictional fit into the receiving portion, the locking portion comprising a first side, a second side, and a third side above the occlusal plane which work together to apply a slight compression against the receiving portion; wherein the dentures may be milled from a digital denture design that is customized to the intra-oral anatomy of the dental patient, wherein the dentures may comprise a handle located towards the anterior side of a first and/or second arch, the handle being milled as part of the prosthesis, the handle having a top side and a bottom side and extending distally in an anterior direction from the first and/or second arch.

Another embodiment of the present invention comprises the upper or lower denture base having a female portion distal of the tooth position, and further comprises the lower or upper denture base having a male portion distal of the tooth position that mates with the female portion of the opposing upper denture base, whereby the upper denture base may be affixed to the lower denture base at an alignment that approximates the proper occlusion. Additional embodiments may place vertical struts or projections more anteriorly, creating vertical extensions of the buccal or lingual cusps of the denture teeth to interdigitate with a fixed element of the opposing dentition or prosthesis.

These and other features of the present invention will be evident from the ensuing detailed description of preferred embodiments, from the claims and from the drawings.

BRIEF DESCRIPTION OF THE DRAWINGS

FIG. 4 a-b shows the right and left perspective views of the inventive denture base with upper and lower portions mated, while

DETAILED DESCRIPTION OF PREFERRED EMBODIMENTS

The present invention provides a structure for facilitating precise alignment of removeable prosthesis during such procedures as "Teeth-in-a-Day." The structure provides many advantages over the prior art. The occlusal locks, which are generally applied to the posterior areas of the prosthesis, give the clinician the ability to bring the entire dentition into maximum interocclusal relationship using the positioning handle to aid in moving the conversion denture into optimal position. This significantly reduces time required for occlusal adjustments. The occlusal locks tend to reduce the need for additional wax evaluations and new interim implant-supported prosthesis, which often are needed because of inadequate alignment of the conversion prosthesis at the initial construction intra-orally. Stabilizing prosthesis with occlusal locks between the upper and lower dentures or natural teeth creates a static occlusal relationship so that the prosthesis is static and thus non-functional from normal use of mastication. Thus, the structure may further provide error prevention to the process of aligning an upper and/or lower prosthetic to an opposing arch.

According to embodiments of the invention shown in FIGS. 3-5, occlusal locks comprise a mating system 200 that are integral to upper 210 and/or lower 220 denture base portions as they relate to the opposing dentition 250. The occlusal locks may be dictated by the opposing dentition 250 customized to the patient's arches. Specifically, the availability of hard surfaces (rather than just gingiva or soft tissue) may drive the selection of which embodiment of occlusal lock the dentist may choose. That is, according to embodiments of the invention, the occlusal lock may be built to lock into a hard structure, rather than just the gum. The hard surfaces opposite the prosthetic may be natural teeth of the patient, existing denture teeth, or a new prosthetic arch, which creates the different embodiments and thus, variable positioning of the occlusal locks onto the hard surface which may serve as an anchor, or as a female portion as described in other embodiments.

Figure 3A:
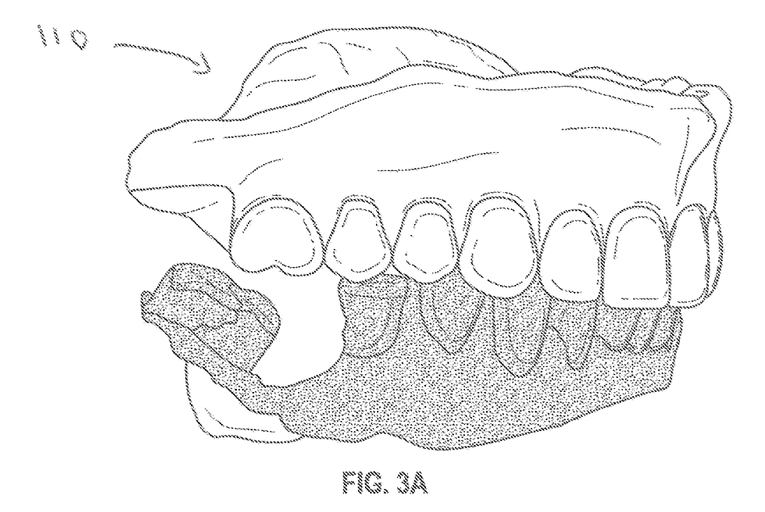
FIG. 3a depicts a CAD software design of a denture base before design of the occlusal lock, 3b shows depicts the same view after the design of the occlusal lock.
Figure 3B:
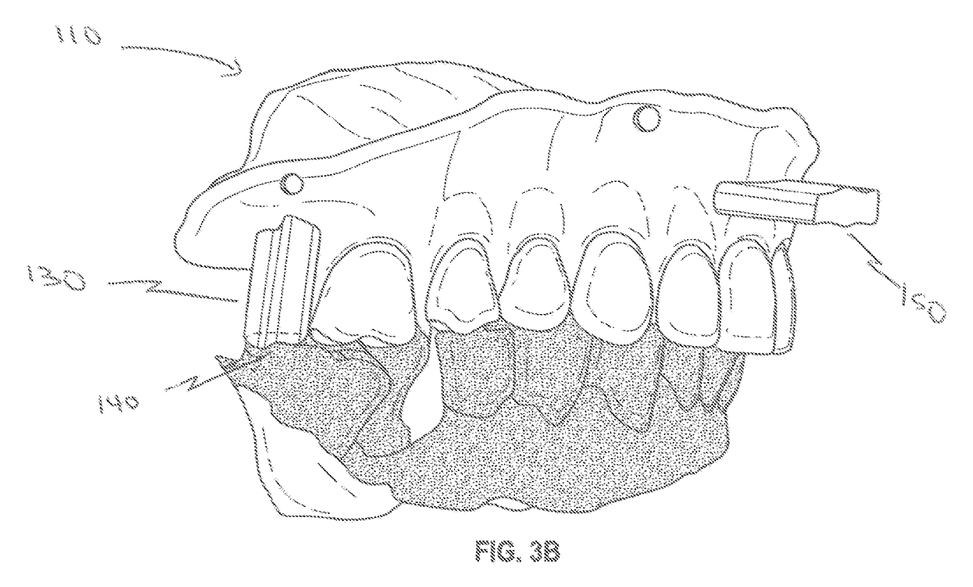
Figure 3C:
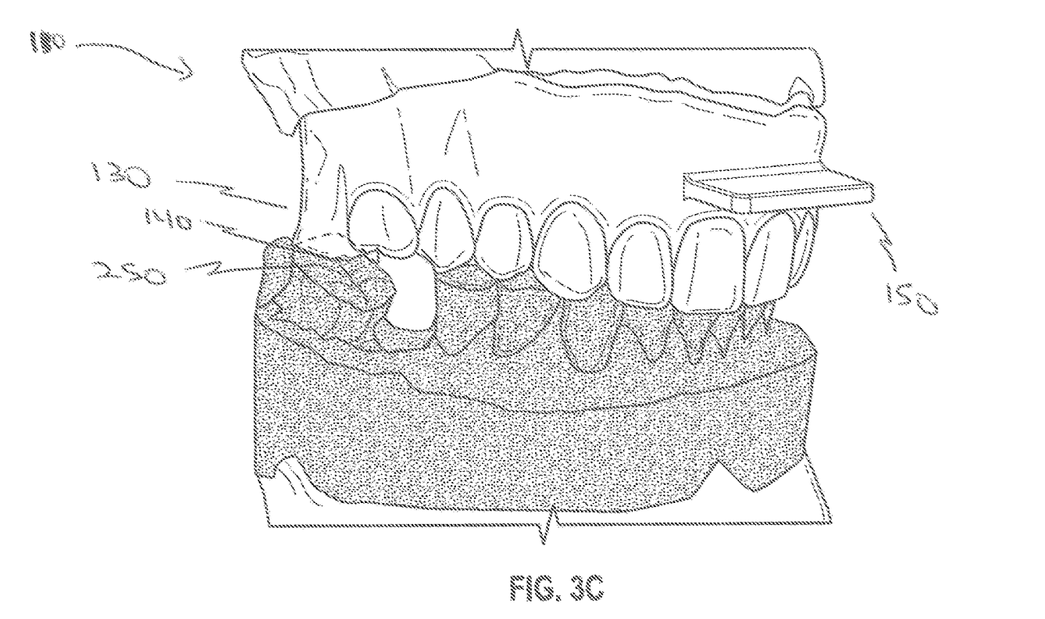
FIG. 3c shows a milled upper denture portion being confirmed with the articulator.
Figure 3D:
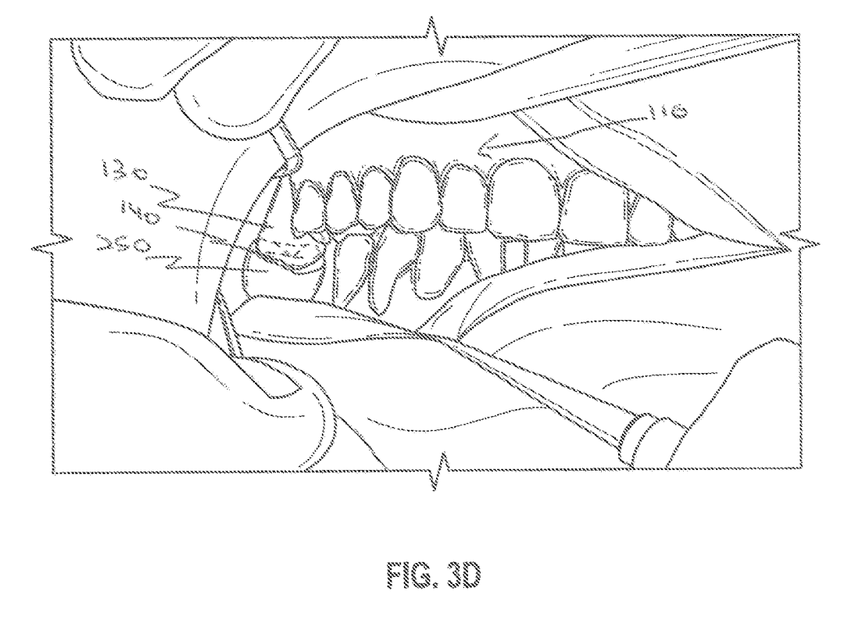
FIG. 3d depicts a view of the occusal lock as it seats during conversion prosthesis technique.
Figure 4A:
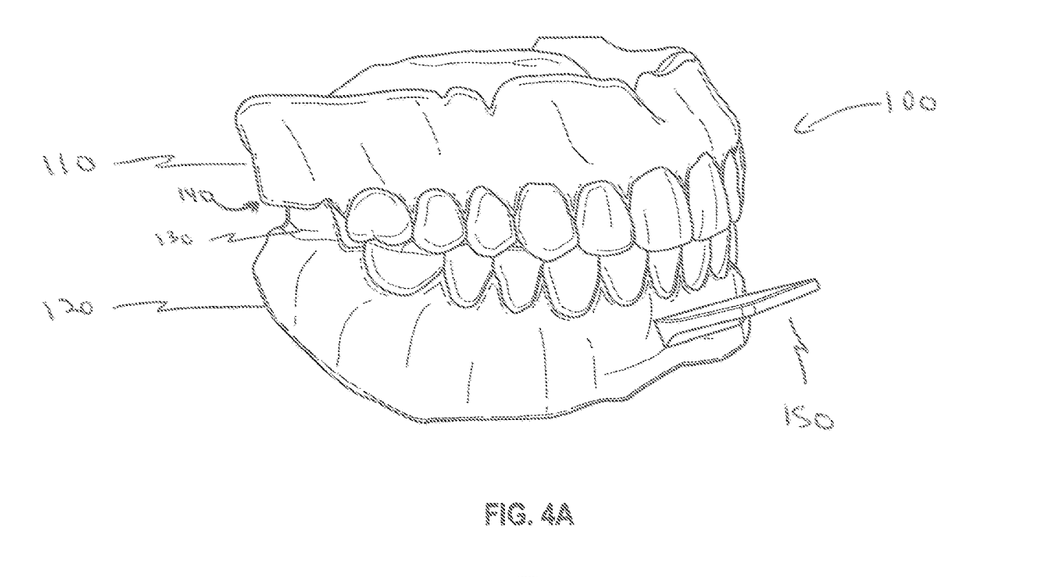
Figure 4B:
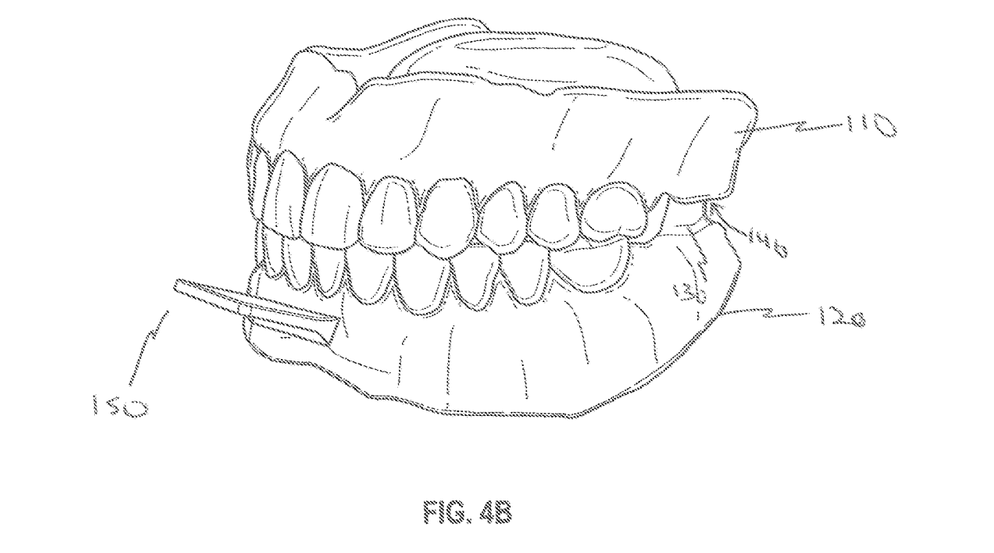
Figure 4C:
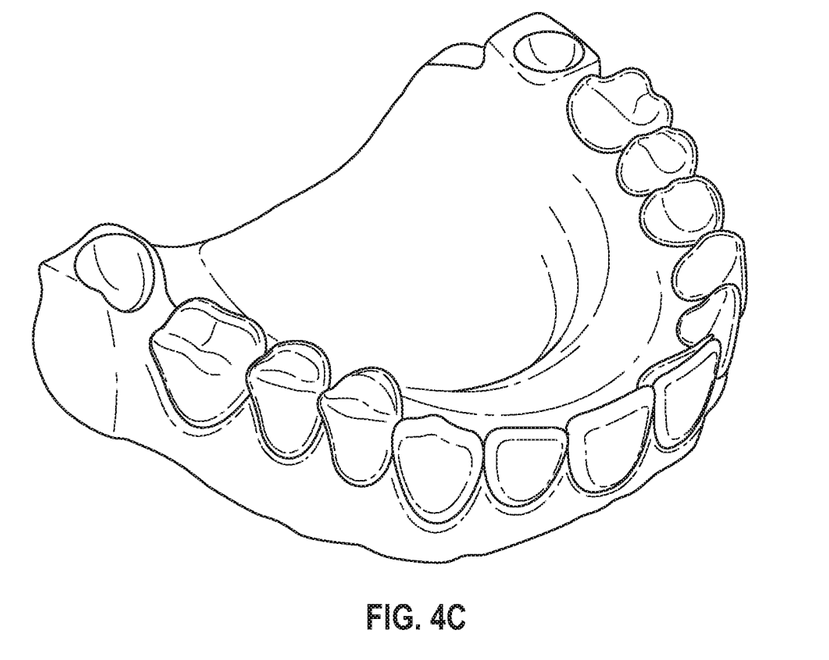
FIGS. 4c-d shows the denture top perspective views of the female and male portions of the occlusal lock, respectively.
Figure 4D:
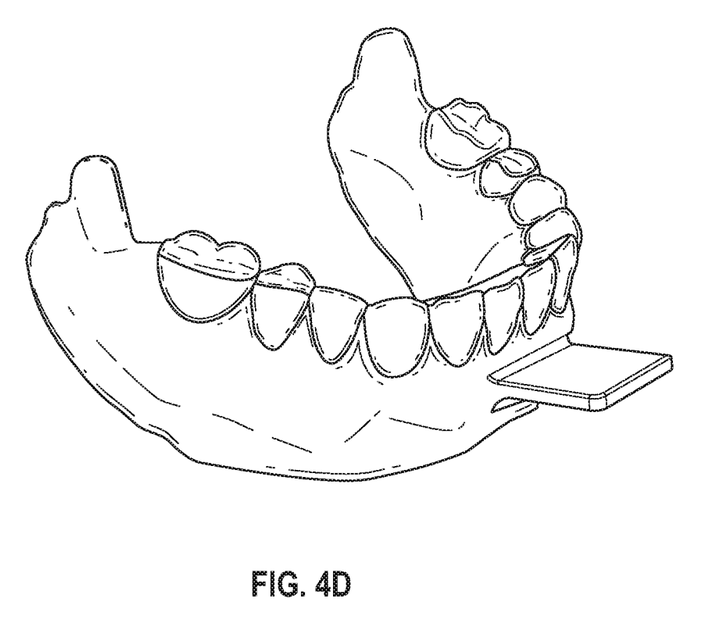
Figure 5A:
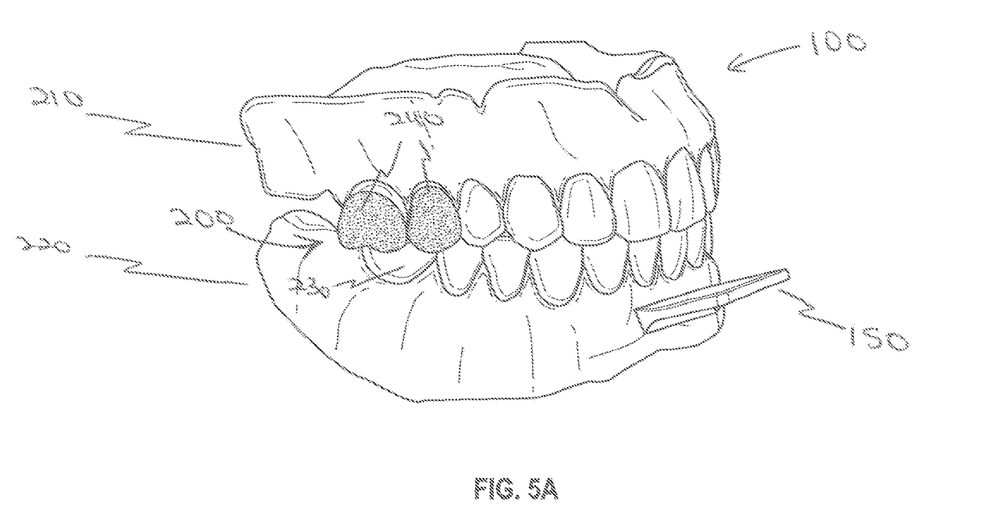
FIGS. 5a-e shows an embodiment of the invention with an upper arch and lower arch mated with an inventive lock applied to a lower arch as part of a digitally-planned set of full dentures, including a) an upper arch planned to lock upon an anterior portion of a lower arch tooth on the right side, b) the lower arch isolated with occlusal locks digitally planned to be added to an anterior tooth on both arches of the full denture, c) a rear cross-section of one of the occlusal locks on the lower arch as planned to engage the opposite arch tooth in a slight compression to hold occlusion, d) a top view of the digitally-planned lower arch having the positioning handle and occlusal locks about anterior teeth, e) a milled lower arch of a full denture having the inventive occlusal locks and positioning handle.
Figure 5B:
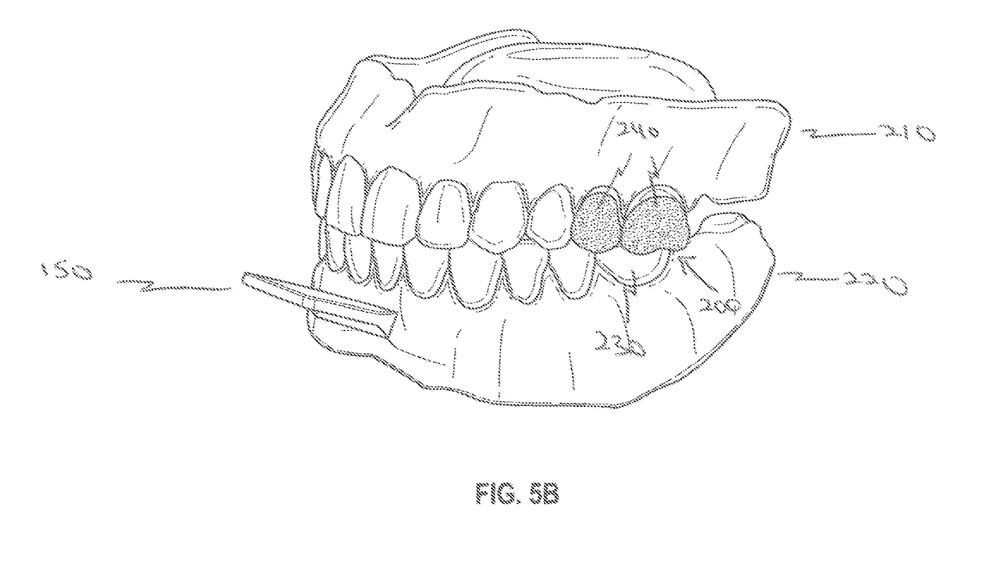
Figure 5C:
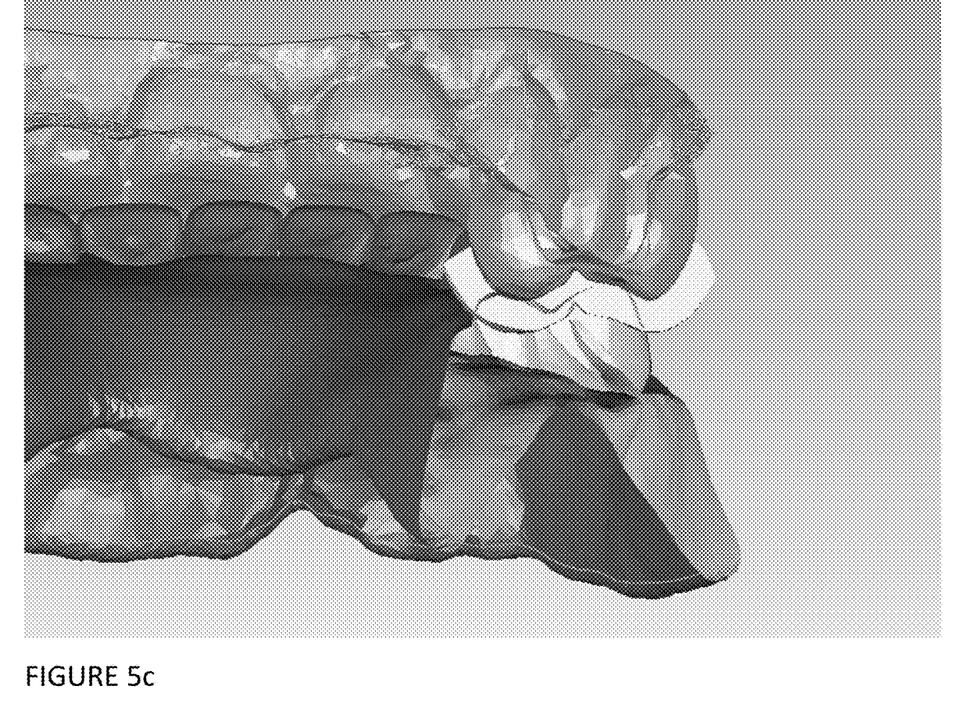
Figure 5D:
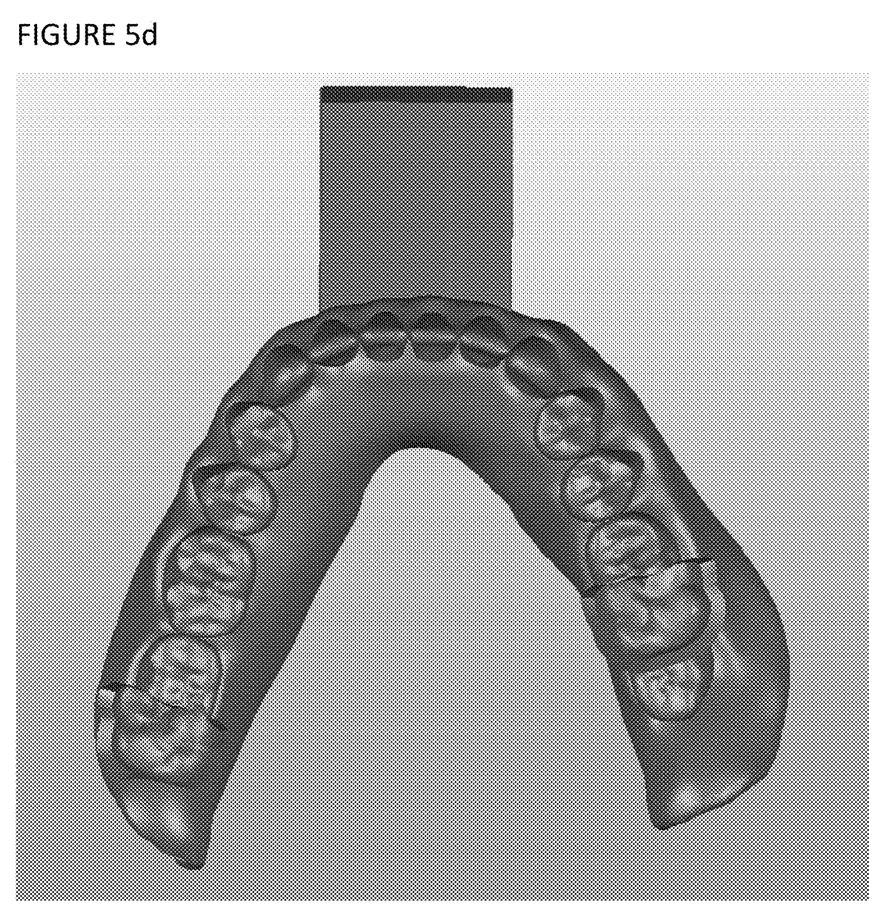
Figure 5E:
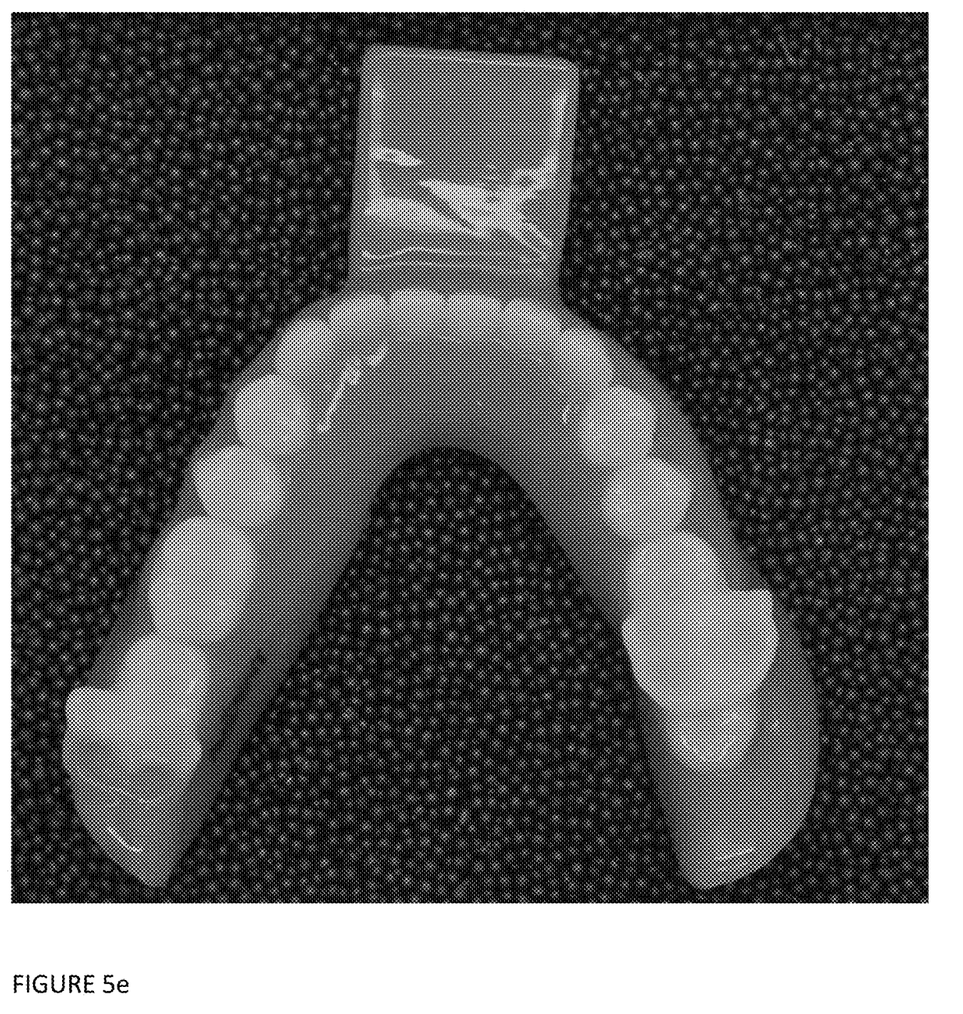

Occlusal locks may be positioned distally of the tooth portion of the denture base so that tooth occlusion and alignment is unaffected by the locks, as seen in FIGS. 4a-4b. In other embodiments of the invention, occlusal locks may be located in other areas of the denture so that occlusion and alignment may be confirmed with the seating of the upper and/or lower denture base portions as they properly relate to the opposing dentition 250 using the positioning handle 150 to move the conversion prosthesis into said occlusal relationship For example, in FIGS. 3a-3d, a first portion 130 of the occlusal lock is positioned anterior of the teeth in the maxilla arch 110 of the prosthetic (here, a denture 100). The first portion 130 projects down to the natural teeth (or model of the natural teeth as illustrated). The first portion 130 may mate with the natural cusps and ridges of the natural tooth 140 in this arrangement, onto a portion of the natural tooth 140, as seen in FIG. 3c or its entire occlusal surface 140 (FIG. 3d) and even beyond (downward onto the buccal/lingual sides or other interdigitate relationship in embodiments not illustrated).

Occlusal locks may comprise a mating system 200 as shown in FIG. 4 that resemble a male portion 130 and a female portion 140. As depicted, the male portion 130 is positioned on the mandibular or the lower denture base portion 120. In the same embodiment, the female portion 130 is positioned at the maxillary or upper denture base portion 110. In this configuration, the upper denture base may seat down onto the lower denture base 120, with some articulation available. The male portion 130 may have vertical projections extending upwardly to a rounded apex, each vertical projection located distally of the tooth structures on the terminal ends of the mandibular arch. Likewise, the female portions 140 may have chambers that are approximately shaped and positioned as the negative molds of the male portions 130, distally of the tooth structures on each terminal end of the maxillary arch.

In still another embodiment shown in FIGS. 5a-e, the occlusal locks may project from a tooth structure, either on the maxilla or mandible portion of the denture as illustrated, toward an opposite occlusal portion of the prosthetic. In this embodiment, the locking portion 230 may have its origin in the first arch (either the maxilla or mandibular portion of the prosthetic) such as a tooth or teeth, and mate at the receiving portion 240 at the second arch opposite the first arch at the tooth or teeth. The locking 230 and receiving 240 portions may occur as a wraparound about the tooth/teeth as seen in FIGS. 5*a-e* (the lingual side), but other embodiments are available in which the male and/or female portions wrap about interproximal spaces of the tooth or teeth, forming a sort of positive mold to the negative spaces creates by the lingual landscape of the tooth or teeth in the opposing arch. In yet another embodiment not illustrated, a first projection from tooth or denture base in the maxilla may resemble the letter M, complementary and mating with the W formed by the at least two of the lower/mandibular teeth of the opposite arch of the prosthetic. As depicted with these embodiments, the receiving portion may simply comprise a tooth or teeth, as the three dimensional aspect of the first portion wraps about the complementary tooth structure(s) in an interdigital or compression relationship and secures the upper prosthetic portion to the lower prosthetic portion.

In another embodiment not depicted, the female and male portions may be switched in opposition so that the male portion is on the upper denture base and the female portion on the lower denture base. This embodiment may apply to any of the above embodiments that disclose a male and female portion.

In another embodiments not depicted, the mating system between the upper and lower denture bases may comprise alternative modes of connection. The male and female portions may have greater lateral profiles than depicted. They may include snap-fit mating structures, a gear-fit structure, or other geometric configurations known the arts to removably stabilize two objects. Stabilizing the two objects of the upper and lower dentures or natural teeth creates a static relationship so that the prosthesis is static and thus non-functional from normal use of mastication.

Technique for Utilizing Inventive Occlusal Locks into a Teeth-In-A-Day® Procedure The following technique describes an exemplary utilization of the inventive occlusal locks in a popular, rapid tooth replacement procedure on a dental patient. Though other prosthetic devices such as crowns and partial dentures, or even double arch dentures are available for use with the inventive occlusal lock and positioning handle structures, a full arch denture for the maxilla arch of a dental patient is described as follows:

1. Make definitive impressions, physical or digital, and provide them to the dental laboratory with a prescription for the digital denture that will become the conversion or temporary denture.

2. In the dental laboratory, optically scan the impressions or pour stone casts made from the impressions and create a virtual articulation. Then, a digital tooth arrangement is designed.

Figure 1:
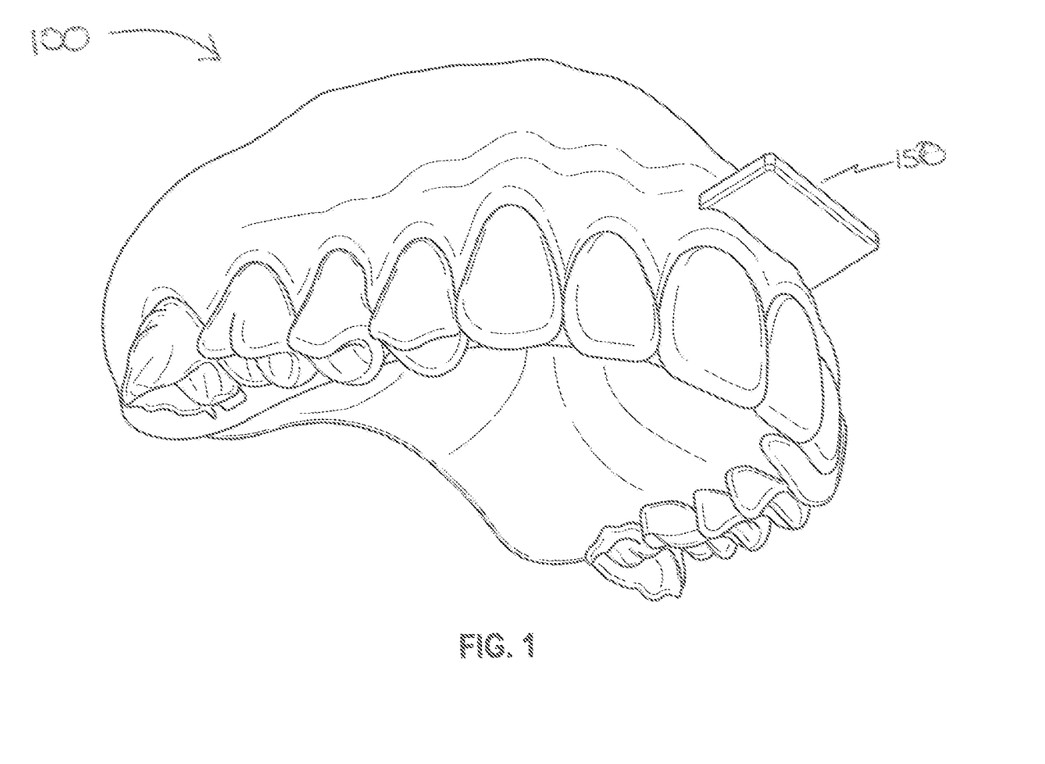
FIG. 1 is view of a digitally designed upper denture portion with the inventive occlusal lock.
Figure 2A:
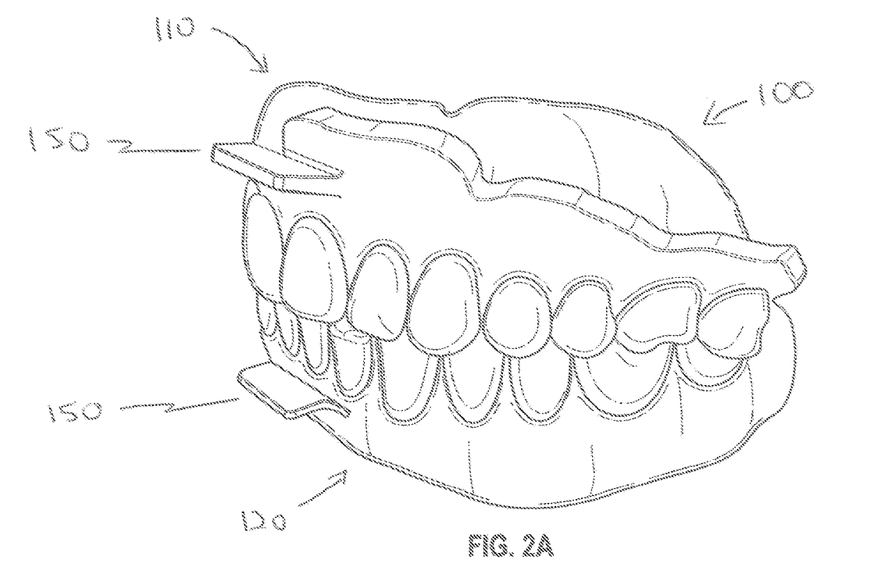
FIGS. 2a and 2b show an embodiment of the invention, using opposing side perspective views of a milled denture with occlusal locks as placed buccal aspects of the maxillary second molars.
Figure 2B:
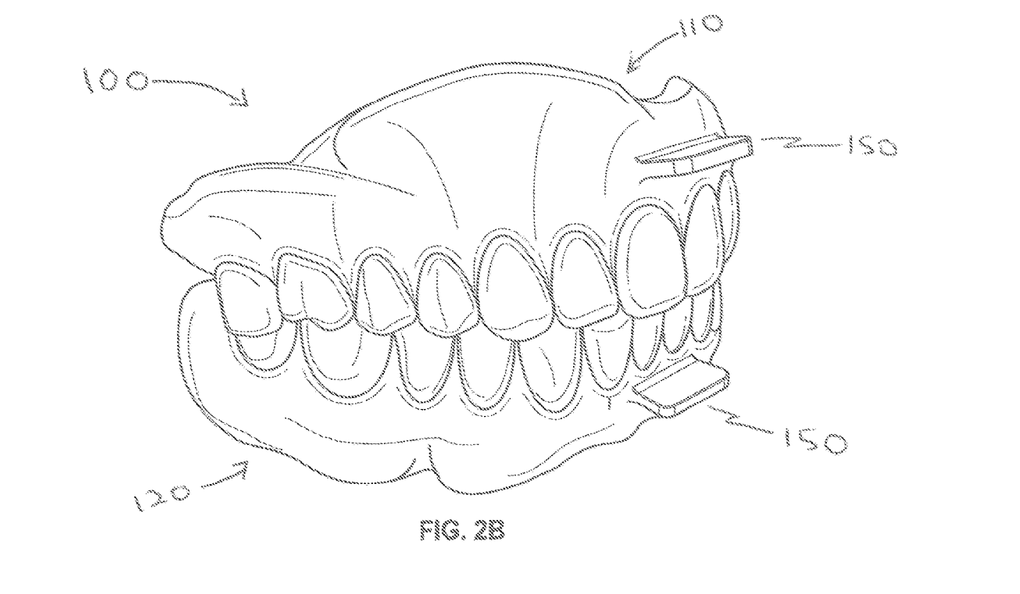

3. Design the positioning handle and incorporate it into the production file for milling a monolithic denture 100, as depicted in FIG. 1. It replaces the heavy gauged wire in the Teeth-in-a-Day protocol. See further, FIGS. 2 *a-b*. Because the handle 150 is designed and milled as part of the denture base, the finishing time for the conversion prosthesis is decreased because the facial aspects of the teeth are unaltered by the prior placement of a heavy gauge wire luted with acrylic resin to the facial surface of the individual denture teeth.

4. Design the occlusal locks and incorporate them into the production file for milling the monolithic denture 100 (See FIG. 1). The occlusal locks may be robotically milled extensions to the buccal or lingual cusps of the posterior teeth or extensions to the denture base distal to the tooth position. The extensions may interdigitate with the opposing dentition by locking onto the buccal or lingual surfaces of the existing dentition 250 (See FIG. 3), the buccal or lingual surfaces of the opposing denture tooth (See FIG. 2 and FIG. 5), or the opposing denture base 240 (See FIG. 4). The occlusal locks may provide verification that the digital denture is positioned properly in relationship to the jaw relation record that was recorded by the optical scanner 5. After the pick-up of the implant component parts is complete, trim the positioning handle 150 and the occlusal locks with a standard acrylic laboratory bur. This step may be accomplished as part of the finishing process and significantly reduces clinical production time during the conversion prosthesis procedure. In certain cases, the denture may be used as a temporary or even ongoing denture, as the occlusion is set ideally.

The invention claimed is:

1. A dental prosthesis comprising:
   an upper portion having a posterior area, an anterior area and a tooth area;
   a lower portion having a posterior area, an anterior area and a tooth area;
   a first portion located towards the posterior area of a first one of the upper and the lower portions of the dental prosthesis, the first portion projecting away from first one of the upper and the lower portions to an opposing arch of a second one of the upper and the lower portions of the prosthesis; and
   a second portion located towards the posterior area of the second one of the upper and the lower portion distally of the tooth area thereof, the second portion having a complementary chamber having the shape of a negative mold of the first portion to receive the first portion thereby joining the upper portion and the lower portion whereby the first portion of the upper or lower portion of the dental prosthesis may lock into the second portion of the opposite one of the lower and the upper portion of the prosthesis in a desired occlusion of the tooth area of the upper portion in contact with the tooth area of the lower portion; and whereby the occlusal relationship between the lower and upper portions of the prosthesis as locked by the first portion and second portion is static and non-functional.

2. The prosthesis in claim 1, wherein the first portion and second portion of the prosthesis are located distally of the tooth area of the prosthesis.

3. The prosthesis in claim 2 wherein the first portion is located in a base portion of and upper or lower portion of the prosthesis.

4. The prosthesis in claim 1, wherein the first portion is located on at least one tooth and/or the second portion of the prosthesis is located on at least one tooth.

5. The prosthesis in claim 1, wherein the first portion is a projection from the first one of the upper and lower portion of the prosthesis, and the second portion is an existing tooth in the tooth area in the second one of the upper and the lower portion.

6. The prosthesis in claim 1, wherein the first portion is located in a base portion of an upper or lower portion of the prosthesis.

7. The prosthesis in claim 1 further comprising a handle located towards the anterior side, the handle being milled as part of the prosthesis.

8. The prosthesis in claim 7, the handle having a top side and a bottom side and extending distally in an anterior direction from the prosthesis.

9. The prosthesis in claim 1 being milled from a digital denture design.

10. The prosthesis in claim 7 being milled from a digital denture design.

11. A mating system for locking an upper or lower denture to an opposing dentition of a dental patient, the mating system comprising:
   a first arch denture having a receiving portion, the first arch denture configured to mate to a second arch comprising a hard surface selected from a group consisting of natural teeth, existing prosthetic teeth, and a new prosthetic arch, the hard surface having a locking portion extending towards the first arch denture, the locking portion seating into a chamber of the receiving portion so that a tooth portion of the first arch contacts a tooth portion of the second arch, the chamber having the shape of a negative mold of the hard surface; and thereby holding the second arch in occlusal opposition to the first arch in a static and non-functional relationship.

12. The mating system in claim 11, the locking portion being at least one tooth on the second arch.

13. The mating system in claim 12, the receiving portion comprising at least a partial positive mold of the locking portion.

14. The mating system in claim 12, the locking portion emanating from at least one tooth towards an anterior side of the first arch, the locking portion forming a slight compression with the receiving portion.

15. The mating system in claim 11, the locking portion having a frictional fit into the receiving portion.

16. The mating system in claim 12, the locking portion comprising a first side, a second side, and a third side above the occlusal plane which work together to apply a slight compression against the receiving portion.

17. The mating system in claim 11 being milled from a digital denture design that is customized to the intra-oral anatomy of the dental patient.

18. The mating system in claim 11 further comprising a handle located towards an anterior side of the first arch.

19. The mating system in claim 18, the handle having a top side and a bottom side and extending distally in an anterior direction from the first arch.

20. The mating system in claim 18 being milled from a digital denture design that is customized to the intra-oral anatomy of the dental patient.

* * * * *